May 1, 1923.

G. ENGEL, SR 1,453,311

ROTARY FILTER

Filed Feb. 25, 1920

Inventor
Godfrey Engel, Sr.
By his Attorney
E. W. Marshall

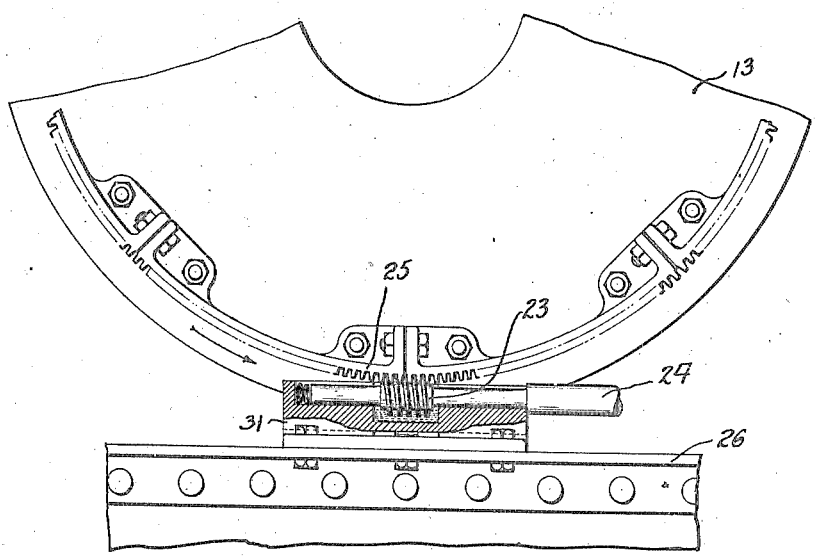
Fig.3.
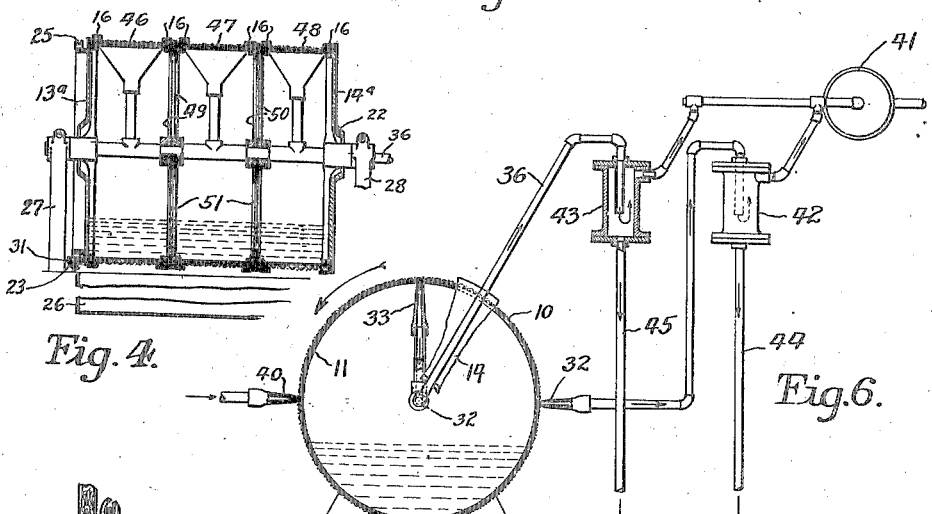
Fig.4.
Fig.6.
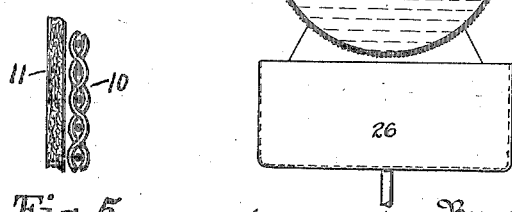
Fig.5.

May 1, 1923.

G. ENGEL, SR

ROTARY FILTER

Filed Feb. 25, 1920

Inventor
Godfrey Engel, Sr.
By his Attorney
E. W. Marshall

Patented May 1, 1923.

1,453,311

UNITED STATES PATENT OFFICE.

GODFREY ENGEL, SR., OF BROOKLYN, NEW YORK, ASSIGNOR TO BUFFALO FOUNDRY & MACHINE CO., OF BUFFALO, NEW YORK, A CORPORATION OF NEW YORK.

ROTARY FILTER.

Application filed February 25, 1920. Serial No. 361,310.

*To all whom it may concern:*

Be it known that I, GODFREY ENGEL, Sr., a citizen of the United States, and resident of Brooklyn, county of Kings, and State of New York, have invented certain new and useful Improvements in Rotary Filters, of which the following is a specification.

The objects of my present invention are to improve and to increase the efficiency of filtering apparatus and particularly to provide a filter of relatively simple construction, which will be self-cleaning, which can be operated continuously and which, moreover, can be adjusted and regulated to suit various conditions and to produce different desired results.

These objects I have accomplished by the employment of a traveling filter screen, causing said screen to filter the material and then operating on the screen in the course of its travel to remove the precipitate and thus continuously clean the screen.

The invention involves various other novel features, constructions, combinations and arrangements of parts, all of which will be disclosed in the course of the following specification.

In the drawings accompanying and forming a part of said specification, I have illustrated the invention embodied in several of its practical and preferred forms, but wish it understood that the same is subject to change and modification to suit different requirements without departure from the true spirit and scope of the invention as defined in the appended claims.

In the drawings referred to, Figure 1 is a vertical sectional view of the filter.

Figure 3 is a broken detail view of the driving gearing for the drum or traveling screen.

Figure 4 is a somewhat diagrammtic view illustrating the manner in which the filter may be built up to any desired capacity out of a number of counter-part units.

Figure 5 is an enlarged broken sectional view illustrating a form of filter cloth made up of an inner fabric and an outer foraminous or reticulated metallic screen element.

Figure 6 is a somewhat diagrammatic view illustrating a possible arrangement of the suction connections.

The traveling filter element, in the present disclosure, is illustrated in the form of a substantially cylindrical drum having a peripheral portion of filter cloth made up of an outer reticulated metallic shell or screen 10 and an inner layer of suitable filtering fabric 11. The metallic screen member, furthermore, is shown in the form of an endless band supported on the annular opposed flanges 12 of the two heads 13 and 14 which form the ends of the drum.

Figure 1:
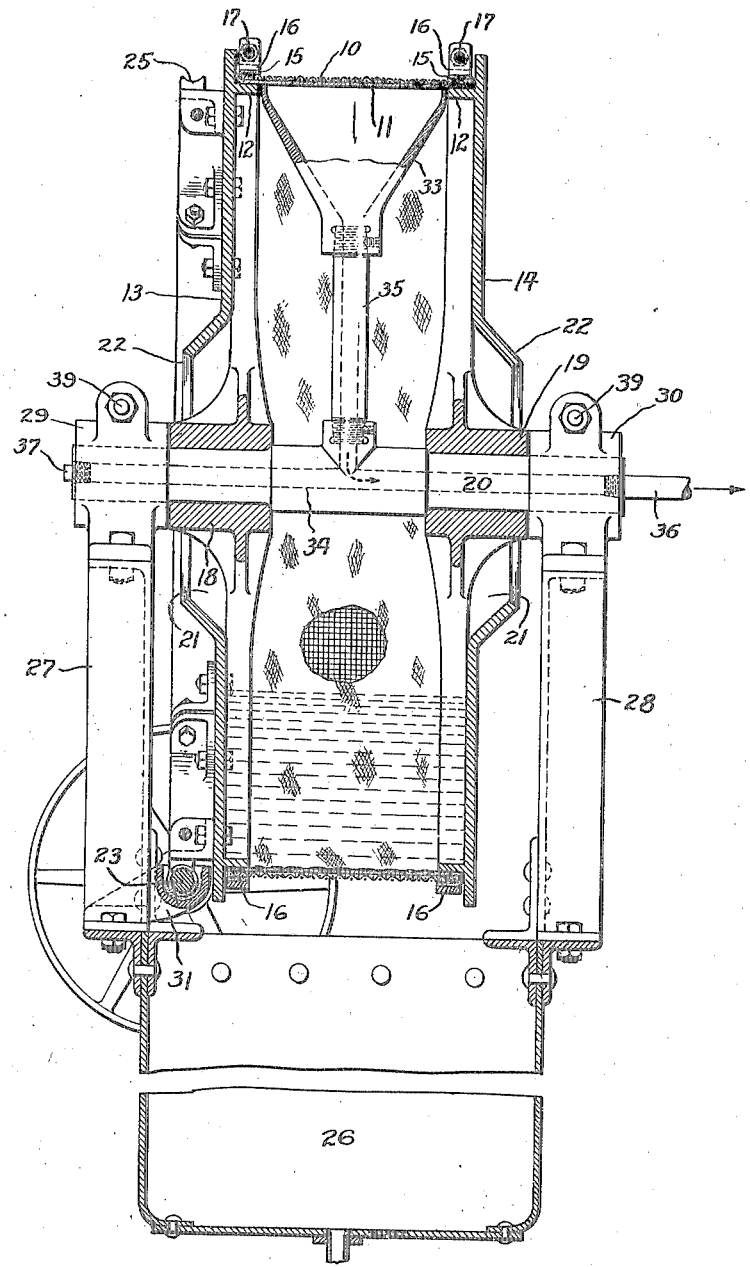

A convenient and desirable method of securing the filtering fabric over the inner face of the metallic screen is shown in Figure 1 wherein the edges of the fabric are indicated at 15 as turned back over the edges of the metallic screen and clamped in such relation by the encircling band clamps 16 which are secured together at their ends by the bolts 17. These band clamps thus serve both to secure the "bag" or filtering fabric and the reticulated metallic screen element upon the supporting flanges of the two end heads.

The drum screen described is supported in the illustration by providing the end heads with the hubs 18 and 19 journaled on the shafting 20.

The liquid to be filtered may be fed into the drum through the axial openings 21 surrounding the supporting hubs and these openings are preferably provided with outstanding and outwardly convergent annular flanges 22 which operate as collectors to prevent splash or loss of the inflowing liquid.

Figure 2:
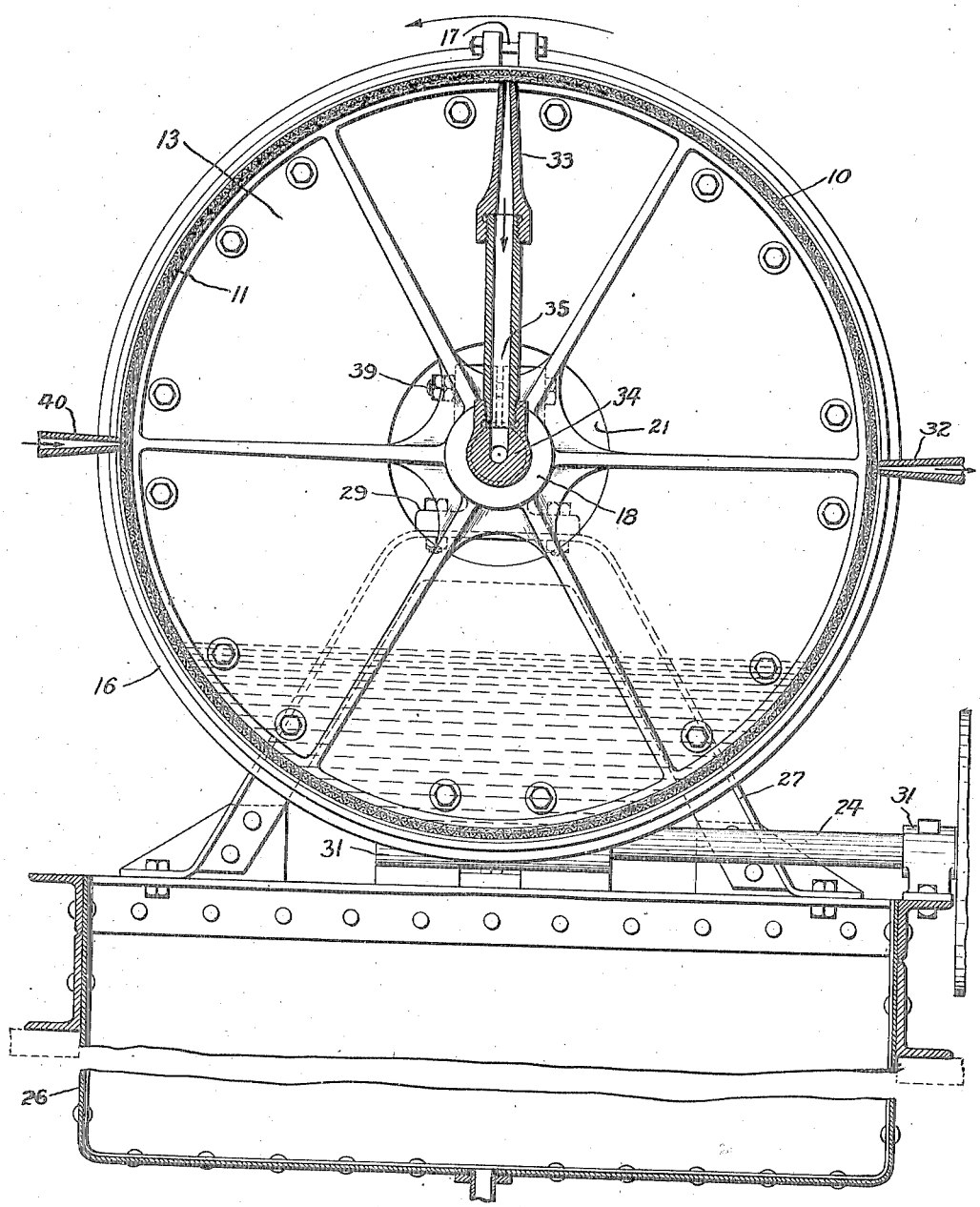
Figure 2 is a similar view taken on a plane substantially at right angles to the plane of Figure 1.

The drum is rotated by any suitable gearing, the same being herein shown as a worm 23 carried by shaft 24 and engaging a worm gear 25 on the end head 13. In Figure 2 I have illustrated an approximate level of the liquid being filtered, the inflow being preferably governed to maintain the liquid within the filtering drum at some such level as this so as to make use of the filtering capacity of the greater portion of the lower half of the drum.

The filtrate issuing from the drum is collected in a suitable receiver, such as the tank 26 located beneath and substantially coextensive with the outside dimensions of the filtering medium.

In the apparatus illustrated, the collecting tank is utilized also as a base for the entire machine, said tank being shown as supporting brackets 27 and 28 at its opposite ends for the bearings 29, 30 for the shafting 20 and as carrying also the bearings 31 for the drive shaft 24.

From the description thus far it will be apparent that the liquid fed into the filtering drum will percolate by gravity through the lower portion of the drum and be collected in the receiving tank.

The filtering medium at the uprising side of the drum carries along with it a certain percentage of the filtrate. To prevent waste or loss of this filtrate by evaporization or the like, I have provided a collector illustrated as a suction nozzle 32 arranged with its mouth closely adjacent to the outer surface of the reticulated screen and adapted to withdraw the filtrate adhering to the filtering cloth. This filtrate collector I have shown as located at about the axis of the drum and at a point above the highest possible liquid level therein.

The filtering medium is constantly cleaned in the course of operation of the machine by means of what I have termed a "scum collector" located inside the drum and shown as a suction nozzle 33 having its mouth disposed closely adjacent the inner surface of the filtering fabric so as to directly remove the precipitate therefrom. This nozzle I have indicated as disposed adjacent the highest portion of the drum so as to be assisted in its action by the force of gravity. Also by this arrangement the scum collector does not operate on the filtering medium until after it has first been partially dried by the filtrate collector and then, further dried by its passage through the air between the two nozzles. If desired, drying means may be provided to assist in this removal of the precipitate.

As a convenient method of mounting the scum or precipitate collector within the drum, I propose to support the same on the relatively stationary shaft 20, which for the purpose is made tubular as indicated at 34, and has connected with it a section of piping 35 to which the nozzle 33 is directly attached. A suction conduit 36 is connected with one or both ends of the tubular shaft and, as in the case shown, where the conduit is connected with only one end of the shafting, the opposite end is suitably closed as by means of a plug 37 (Fig. 1).

As it may be desirable at different times to vary the point at which the scum or precipitate is collected, I have shown the scum collector as adjustable through the medium of rocking the tubular shaft on which it is mounted, the bearings 29, 30 for said shaft being shown in Figs. 1 and 2 as split and as clamped in engagement with the shaft by the bolts 39. When these bolts are loosened, it will be obvious that the shaft may be rocked one way or the other and the scum collector be thereby shifted angularly about its center of support.

To overcome the possibility of any gradual accumulation of deposits, and to remove any strongly adherent particles, I have provided means in the form of a blast nozzle 40 for directing a cleansing blast from the outside of the screen inward through the filtering medium. This blast also has a purifying effect on the medium.

In Figure 6 I have illustrated a convenient and practical method of operating the two suction nozzles 32 and 33, the same being shown as connected by suitable piping with a suction pump 41, suitable separators such as those indicated at 42 and 43 being interposed in the suction lines leading to the pump to prevent the filtrate or scum passing on to the pump. The filtrate taken into the filtrate separator 42 may be led by piping 44 back to the collecting tank and the scum from the separator 43 may be carried away by the piping 45.

A special advantage of the construction disclosed is that it may be built up unit by unit into a filter of practically any desired capacity. This possibility I have illustrated in Figure 4 in which view 46, 47 and 48 designate three filter units disposed side by side on a common axis and consisting of three drum sections supported between end heads 13ª and 14ª and the intermediate heads 49 and 50. The end heads 13ª and 14ª are shown as similar in construction to the end heads 13 and 14 in Figure 1 and the intermediate heads 49 and 50 are of like construction, except that they are more in the nature of spiders having passages 51 therethrough to permit free flow of the liquid between the several sections. It will be seen, that by increasing the length of the shafting and adding as many intermediate sections as may be needed, the filter may be built up practically to any required capacity.

In the constructions which I have illustrated in Figures 7 to 10, the impetus of the inflowing material is utilized as a force to assist the filtering operation. In these views the material to be filtered is introduced into the drum by a supply nozzle 55 arranged with its mouth closely adjacent the inner surface of the filter cloth and at a point above the liquid level therein. This manner of forceful introduction causes a certain amount, including a lighter portion of the liquid to pass directly through the filter cloth, as indicated at 56, which lighter filtrate may be caught in a separate receptacle 57. The balance of the introduced material settles and filters by gravity, as in the construction first described.

Figure 7:
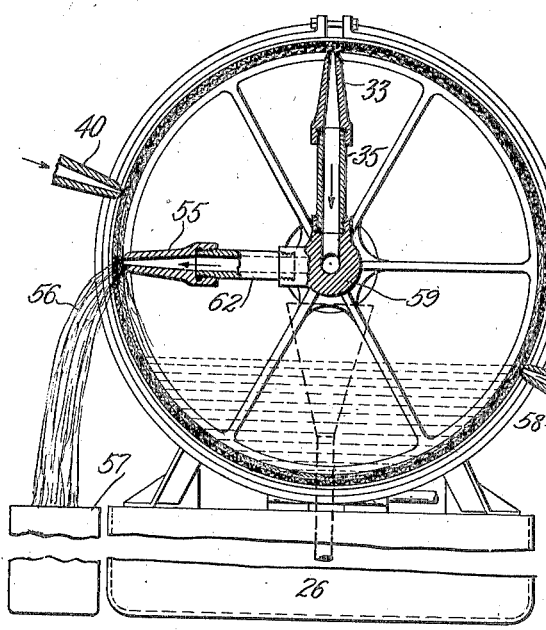
Figures 7 and 8 are vertical sectional views of a modified structure in which the material to be filtered is forcibly introduced to the filter screen and in which, also, a part of the filtrate is drawn off through a suction nozzle.

The filtering action may also, under certain circumstances, be assisted by suction. Thus I have shown at 58 a nozzle arranged to exert suction through the filtering element on the body of liquid within the filter. This suction nozzle may be disposed at higher or lower levels to draw off lighter or heavier grades of filtrate, or simply so as to operate on the body of liquid at different levels. This suction nozzle may be utilized also as a means for maintaining the body of liquid at a certain definite level, as is indicated in Figure 7. The suction nozzle 58 may, if desired, be coupled up with the filtrate collecting nozzle 32 which usually is located at a higher level.

Figure 8:
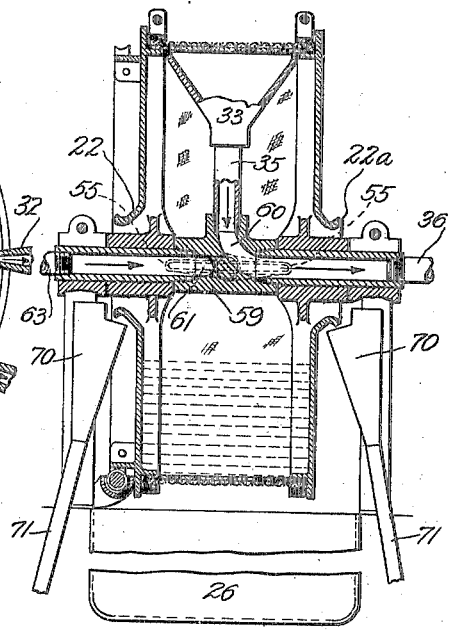
Figure 9:
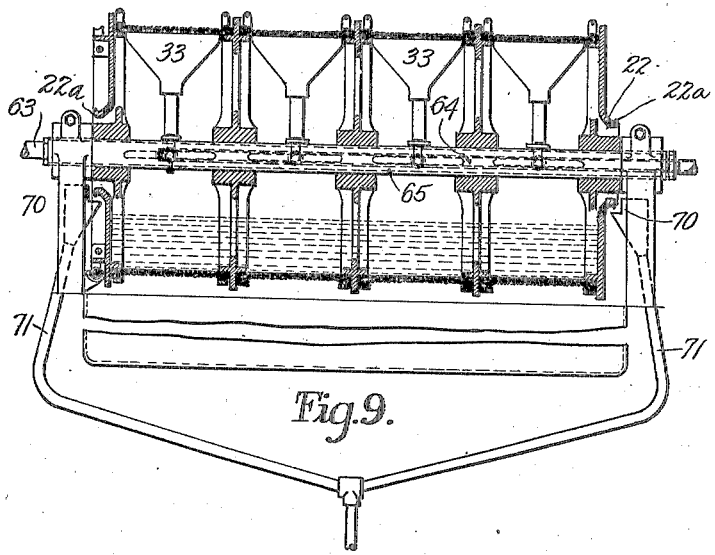
Figures 9 and 10 are broken sectional views of a multiple construction of this latter type of filter.
Figure 10:
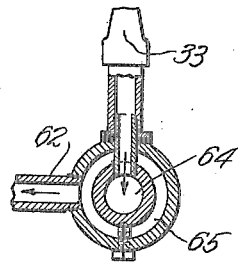

In Figure 8 I have shown how both the supply nozzle and the scum collecting nozzle may be supported on the one section of shafting which, for the purpose of separating the two conduits, is provided with a special fitting 59 having one passage 60 open to the conduit 35 of the scum collector 33 and having another passage 61 arranged at an angle to the first passage and having connected therewith the piping 62 which supports the supply nozzle 55. In such a construction the suction piping 36 is connected with the end of the hollow shafting which is in communication with the scum passage 60 and the other end of the shafting has connected thereto a supply conduit 63. Where a multiple construction such as that illustrated in Figure 9 is used, the separate passages for the inflowing liquid and the outgoing scum may be provided by making the shafting with concentric passages 64 and 65, one connected with the scum collecting nozzles 33 and the other connected with the delivery nozzles 55.

In the operation of the constructions last described, it will be seen that the liquid entered in the drum, filters by impetus, gravity and suction consecutively and that the residue or precipitate is continuously removed from the filtering medium, which is furthermore cleaned by a blast of steam, compressed air or other fluid.

It is possible with the constructions disclosed to verify the operation of the filter at any time and to keep it under such control as to obtain the desired results with different filtering materials. Either or all of the forces of impetus, gravity and suction may be utilized as seems best under different circumstances.

The filtrate may be removed at one or more different points, so as to get different grades of filtrate, which grades, of course, may be separately collected. The residue or precipitate may be removed at one or more different points and may consist of natural impurities or matter which has been added to the filtering liquid to aid or improve the filtration thereof. In the latter event and in certain other cases, the precipitate may be collected and saved for further or other use.

Another feature of the invention which I have illustrated particularly in Figure 9 is the provision of means for collecting any surplus or overflow. Thus in the view referred to I have shown the flanges 22 at the axial openings in the end heads as flared outwardly at 22ª to provide overflow lips emptying into collecting troughs 70 shown provided with piping 71 for returning the surplus back to the source of supply. With this construction, in case the filtering liquid is supplied at too rapid a rate or in case the filtering medium should operate too slowly, the excess liquid is caught and returned to the source of supply in readiness to be passed back to the filter.

What I claim is:

1. A filter comprising a rotary drum having a peripheral portion of filter cloth, means for feeding the liquid to be filtered into the axial portion of the drum and a collecting tank for the filtrate disposed beneath and coextensive with the lower portion of the drum, said drum having end heads closed except at the axial portions thereof where the liquid is entered and provided at such axial portions with substantially circular openings surrounded by outwardly converging annular collecting flanges.

2. A filter comprising a rotating drum screen, means for feeding the liquid to be filtered into said drum, means for collecting the filtrate issuing from the screen and additional means for abstracting the filtrate adhering to the screen and including a stationary suction nozzle outside the drum and supported with its mouth in close proximity to the outer surface of the screen and at a point above the possible liquid level in the drum.

3. In a filter, a rotating drum screen, means for feeding the liquid to be filtered into said drum, means for collecting the filtrate issuing from the drum and a suction nozzle disposed with its mouth adjacent the inner surface of the screen and at a point above the possible liquid level in the drum.

4. In a filter, a rotating drum screen, means for feeding the liquid to be filtered into said drum, means for collecting the filtrate issuing from the drum, a suction nozzle disposed with its mouth adjacent the inner surface of the screen and at a point above the possible liquid level in the drum and a filtrate collecting nozzle disposed with its mouth adjacent the outer surface of the screen and at a point to operate on the screen in advance of the first mentioned suction nozzle.

5. In a filter, a rotating drum screen, means for feeding the liquid to be filtered into said drum, means for collecting the filtrate issuing from the drum, a suction nozzle disposed with its mouth adjacent the inner surface of the screen and at a point above the possible liquid level in the drum, a filtrate collecting nozzle disposed with its mouth adjacent the outer surface of the screen and at a point to operate on the screen in advance of the first mentioned suction nozzle and means for directing a cleaning blast inwardly through the screen and disposed to operate on the screen after the screen has been acted upon by the first mentioned suction nozzle.

6. In a filter, supporting means, a tubular shaft rotatably adjustable in said supporting means, a nozzle carried by said shaft and adjustable therewith and a traveling filter screen operating about the shaft and acted upon by said nozzle.

7. A filter comprising split bearings, a tubular shaft mounted in said bearings, means for clamping the bearings on said shaft to hold the same in various angularly adjusted positions, a collector supported by said shaft and a drum screen rotating about the shaft with its inner surface in close proximity to the mouth of said collector.

8. In a filter a rotating drum screen, means for feeding the liquid to be filtered into said drum, means for collecting the filtrate issuing from the drum, a relatively stationary suction nozzle disposed with its mouth adjacent the inner surface of the screen at a point above the possible liquid level in the drum, a filtrate collecting nozzle disposed with its mouth adjacent the outer surface of the screen and at a point to one side of the inside suction nozzle and a nozzle for directing a cleaning blast inwardly through the upper portion of the screen at a point above the liquid level in the drum.

In witness whereof, I have hereunto set my hand this 17th day of February, 1920.

GODFREY ENGEL, Sr.